Patented Apr. 14, 1925.

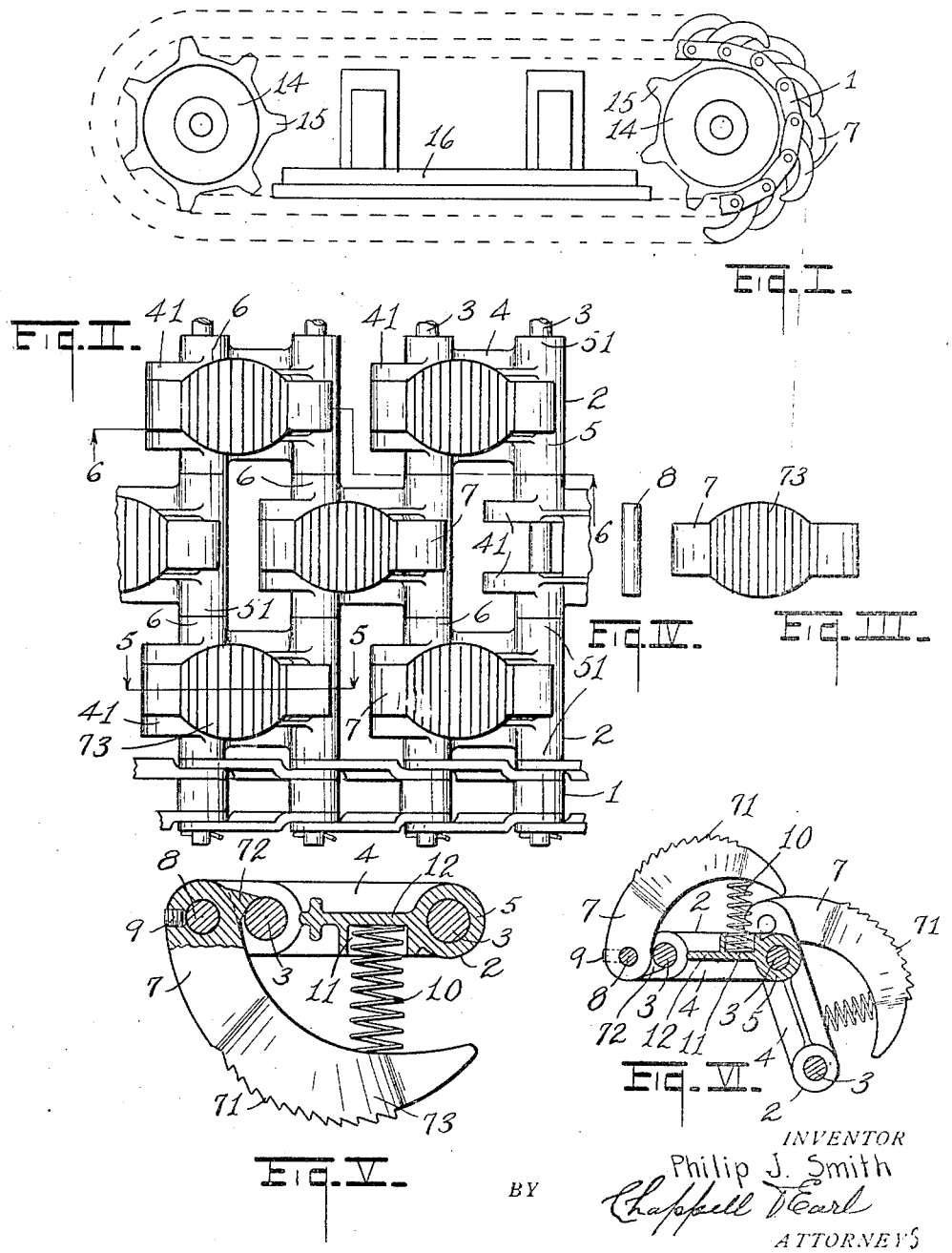

1,533,353

UNITED STATES PATENT OFFICE.

PHILIP J. SMITH, OF SAGINAW, MICHIGAN,

FEED CONVEYER FOR PLANERS.

Application filed May 24, 1924. Serial No. 715,578.

*To all whom it may concern:*

Be it known that I, PHILIP J. SMITH, a citizen of the United States, residing at Saginaw, county of Saginaw, State of Michigan, have invented certain new and useful Improvements in Feed Conveyers for Planers, of which the following is a specification.

This invention relates to an improved feed conveyer for planers, the same being particularly an improvement upon the structure appearing in my Patent No. 1,495,816 dated May 27, 1924.

The objects of the invention are:

First, to provide such a conveyer with an improved construction of feed dog whereby the area of the surface is more completely covered and a broader engagement provided for the stock that is being fed.

Second, to provide such an improved construction and support for the feed dog whereby the feed dog can be readily removed for sharpening or to be replaced by a new dog.

Further objects, and objects pertaining to details will appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a side elevation section of an endless conveyer with sprocket means showing the position of the hold-down shoes.

Fig. II is an enlarged detail inverted plan view of a section of a conveyer showing the staggered relation of the feed dogs to each other.

Fig. III is an inverted plan view of one of the feed dogs detached.

Fig. IV is a detail of the pivot for the dog.

Fig. V is an enlarged detail sectional view with the dog shown in elevation, taken on line 5—5 of Fig. II, looking in the direction of the arrows.

Fig. VI is an enlarged detail sectional view taken on line 6—6 of Fig. II, showing the relation of the parts, the dog pivot shown exposed so that it may be readily removed.

In the drawing similar reference characters refer to similar parts throughout the several views, and the sectional views are taken looking in the direction of the little arrows at the ends of the section lines. The parts of the drawing will be refererd to by their numbers.

1 is the conveyer chain made up of alternate links 2 carried on long pintles 3. Each link constitutes a dog carrier and is made up of side parts 4 and is journaled on the pintles by a suitable sleeve 5 at the front end extended into bosses 51 and laterally extending bosses 6 at the rear end. The sides 4 extend at 41 into lugs between which is disposed the dog 7. A dog pivot 8 extends between the lugs 41, and the dog 7 is secured thereto by a flush set screw 9. The dog is provided with forwardly pointing teeth 71 and a forwardly projecting lug 72 strikes against the chain pintle 3 to limit the downward movement of the dog. A coiled spring 10 is in a suitable seat 11 on the cross web 12 of the link and engages the upper side of the front end of the dog 7 in a spring seat therein.

The broad conveyer chain is carried by the sprocket wheels 14, the teeth 15 of which engage the rear end of each link at one side of the other of the lugs 41, as many sprocket wheels with teeth being provided as are necessary to effectively support and drive the conveyer chain.

A hold-down shoe 16 is provided for the body of the chain. This may be one broad shoe or a series of narrow shoes holding the chain down to its work at proper intervals as is necessary for the work to be performed.

Each dog is provided with a broad face 73, the sides being rounded as indicated in Fig. III. This practically covers the face of the chain so that small blocks and narrow pieces when fed to the machine will be certainly engaged and carried forward. Of course the dogs can be made with straight sides as appears in my said former structure and the benefit of the removable feature be secured. The conveyer chain may be driven by any means that will properly engage the sprocket wheels, whether teeth or other means.

I desire to claim my invention specifically and broadly as pointed out in the appended claims.

Having thus described my invention, what I claim as new and desire to secure by Letters Patent, is:

1. An endless feed conveyer chain with broad links each constituting a feed dog carrier, chain pintles for coupling the said links alternately together, dog carrying ears formed on the rear of said links, feed dogs pivoted between said ears, short pivots therethrough, the links being formed with laterally extended bosses at the rear extending at each side of the said dog carrying ears, and sprocket wheels with teeth engaging the said links at the side of the feed dog supports, co-acting as specified.

2. An endless feed conveyer chain comprising dog carrier links, each said link being provided with rearwardly projecting dog carrying ears, a feed dog, a pivot therefor and lateral rear bosses, and a sprocket wheel with teeth disposed to engage said bosses.

In witness whereof I have hereunto set my hand.

PHILIP J. SMITH. [L. S.]